United States Patent Office 2,945,861
Patented July 19, 1960

2,945,861
DYES OF THE 1,4-DIAMINO-2,3-ANTHRAQUINONE-DICARBOXIMIDE SERIES

Fritz Baumann, Leverkusen-Bayerwerk, Germany, assignor to Farbenfabriken Bayer Aktiengesellschaft, Leverkusen, Germany, a corporation of Germany No Drawing. Filed Mar. 4, 1958, Ser. No. 718,980

Claims priority, application Germany Mar. 12, 1957

11 Claims. (Cl. 260—272)

This invention relates to novel anthraquinone dyestuffs and to a process for their production.

It has been found that anthraquinone dyestuffs are obtainable by reacting o-dicyananthraquinones which may be further substituted in the anthraquinone radical, or isoindolenines obtainable from these o-dicyananthraquinones by treatment with acids or by reaction with alcoholates, alkali metal hydroxides, alkali metal sulphides, ammonia or ammonium derivatives, with amines of the general formula

I wherein X stands for a carbon atom or a hetero atom such as N, O, or S, and Y for the radical required for the formation of a possibly substituted 5- or 6-membered ring.

o-Dicyananthraquinones suitable for the process of the invention are for example 1,2-dicyananthraquinone, 2,3-dicyananthraquinone or substituted o-dicyananthraquinones containing for example, halogen, nitro, amino, acylamino, hydroxyl, alkoxy groups or sulphonamide groups which may be substituted at the nitrogen atom. Compounds of this type are for example 1,4-diamino-2,3-dicyananthraquinone, 1,4-diamino-2,3-dicyano-6-chloranthraquinone, 1,4 - diamino-2,3-dicyan-6,7-dichlor-anthraquinone, 1,4 - diamin-2,3-dicyano-5-nitro-anthraquinone, 1,4 - diamino-2,3-dicyano-6-sulphodimethylamido-anthraquinone etc.

The isoindolenines which may also be used as a starting material and are obtainable from the aforesaid o-dicyananthraquinones by treatment with acids or by reaction with alcoholates, alkali metal hydroxides, alkali metal sulphides or ammonia derivatives such as primary or secondary amines may be illustrated, when starting from 1,4-diamino-2,3-dicyananthraquinone, in one of their tautomeric forms by the following formulae:

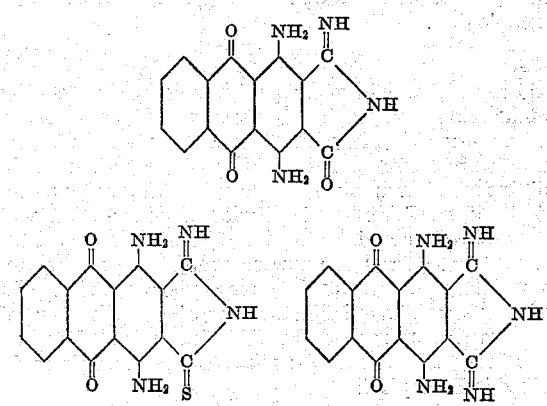

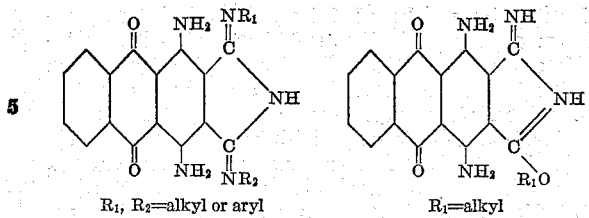

$R_1$, $R_2$=alkyl or aryl   $R_1$=alkyl

The manufacture of these isoindolenines can be carried out by the process described in "Angewandte Chemie," vol. 68 (1956), page 134 ff. It is moreover possible to use the process described in German patent specification No. 950,949 by which dicyananthraquinones are hydrolysed with acids.

Amines of the general formula

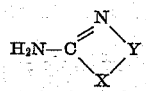

which are suitable for the new process are for example 2-aminoimidazoles, 2-aminothiazoles, 2-aminopyridines, 3-amino-1,2,4-triazoles, diaminopyrimidines, diaminotriazines and the like.

The manufacture of the new anthraquinone dyestuffs may be effected in a simple manner by mixing the reaction components and heating the reaction mixture for some time. Temperatures within the range of 70–230° C., preferably 140–210° C., are generally sufficient. In some cases it may be expedient to work in the presence of an inert solvent such as trichlorobenzene, nitrobenzene, o-dichlorobenzene or naphthalene. Dependent on the quantity of the amine of the above mentioned general Formula I employed and the isoindolenines used, this amine may enter once or twice into the anthraquinone molecule. It is therefore also possible for two different amine molecules to enter into one anthraquinone molecule. In this case 1 mol of the dicyananthraquinone is, for example, first reacted with 1 mol of one amine and then, either after previous isolation of the reaction product thus formed or directly in the same melt with 1 mol of a second amine. The working up of the reaction product may be effected in usual manner.

The new anthraquinone dyestuffs are generally barely soluble in organic solvents and may be used as pigments, for example in pigment printing, or also as vat dyestuffs. They generally yield very clearly and intensely coloured blue to green vats. In a mixture of pyridine and methanol (1:1) some of them form very deeply coloured alkali metal salts which may be soluble.

If desired, the dyestuffs thus obtained may be alkylated by known methods.

The following examples are given for the purpose of illustrating the invention.

Example 1

3 parts by weight of 1,4-diamino-2,3-dicyananthraquinone and 18 parts by weight of 2-amino-6-ethoxy-benzthiazol are heated together to 160–170° C. for about 6 hours. The olive-green melt is then cooled to 120° C., 40 parts by weight of pyridine are added with stirring and then, at 30–40° C. 60 parts by weight of acetone. The brownish black needles are filtered off at room temperature and the residue is thoroughly washed with acetone. The dyestuff thus obtained in very good yield is barely soluble in organic solvents. When vatting in the presence of a little pyridine, an emerald-green vat is obtained. From the green vat cotton is dyed in greenish grey shades.

The dyestuff dissolves in concentrated sulphuric acid with a reddish brown colour; when pouring the sulphuric acid solution into water, the dyestuff precipitates in olive-black flakes.

Example 2

5 parts by weight of 1,4-diamino-2,3-dicyananthraquinone are heated in the tenfold amount of 2-aminopyridine to the boil (204–206° C.) for 1½ to 2 hours. The barely soluble nitrile thereby dissolves first with a blue colour. The melt becomes rapidly greener and already after ¾ hour long bluish black prisms separate out in the hot. On further heating the melt thickens. The reaction is now interrupted, the mixture cooled to 130–140° C., and 50 parts by weight of pyridine are carefully run into it. The crystals are filtered off with suction at 70° C., washed with pyridine and methanol and dried. The basic dystuff dissolves in concentrated hydrochloric acid with a red colour, the acid paste shows a green colour and changes to bluish green on the addition of ammonia. The colour of the solution in concentrated sulphuric acid is olivish yellow-green. After suitable formulation, the substance may be used in pigment printing.

Example 3

10 parts by weight of the hydrolysis product described in Example 1 of U.S. patent specification No. 2,770,625, from 1,4-diamino-2,3-dicyananthraquinone and sulphuric acid of the presumed formula

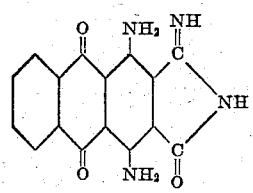

6 parts by weight of 2-amino-benzimidazol and 300 parts by weight of trichlorobenzene are heated at 200° C. for several hours. Whilst the reaction product partially precipitates, the mixture becomes dull green. After completion of the reaction, 200 parts by weight of acetone are carefully run into the mixture at about 50° C. and the product is filtered off with suction in the cold. The filter residue is washed with acetone and dried. The new dyestuff dissolves in sulphuric acid with a yellowish brown colour, yields in a mixture of pyridine and methanol with the addition of sodium hydroxide solution a blue sodium salt, vats cornflower blue and dyes cotton from the vat olive green. It may be recrystallized from quinoline wherein it dissolves with a clear green colour. The substance may very easily be alkylated in a mixture of pyridine and methanol for example by using dimethylsulfate or diethylsulfate. The alkylated derivative also yields olive green dyeings which however show no longer the sensitivity to alkali of the starting material.

Example 4

10 parts by weight of 1,4-diamino-2,3-dicyananthraquinone, 10 parts by weight of 2-amino-benzimidazol and 300 parts by weight of trichlorobenzene are heated under reflux to about 200° C. for 1 hour and then to 215–218° C. for 4–5 hours. After ½ hour the initially blue melt has already acquired an olive green colour. With the splitting off of ammonia the crystallized condensation product precipitates. At the end, the solution has only a weak greyish blue colour. The barely soluble dyestuff thus formed may be filtered off with suction on a suction filter either directly or after previous dilution with a suitable solvent such as methanol, acetone, pyridine. After washing with methanol and drying, a black crystal powder is obtained. The substance dissolves in concentrated sulphuric acid with an orange-brown, in sulphuric acid (60° Bé.) with a red colour. The vat colour is blue. The dyestuff which is barely soluble in organic solvents dyes vegetable fibres from the vat in full greenish grey shades and may also be used for printing. The imidazole derivative thus obtained may be alkylated in usual manner, for example by the following process:

A mixture of—

4 parts by weight of the imidazole dyestuff described above
5 parts by weight of potash
6 parts by weight of p-toluene-sulphonic acid methylester and
40 parts by weight of nitrobenzene is heated with stirring to 160° C. for about ½ hour. The methylated dyestuff is filtered off with suction at room temperature, washed with nitrobenzene, methanol and, finally, with water, in order to remove the salts. By this alkylation three methyl groups are introduced into the dyestuff molecule. Instead of the p-toluene-sulfonic acid methyl ester there can be used also the p-toluene sulfonic acid ethyl ester. In contrast to the starting substance, the alkyl derivatives no longer changes when suspended in a mixture of pyridine and methanol with sodium hydroxide solution. The color of its solution in sulfuric acid is reddish brown, the vat color greenish blue. The dyestuff which crystallizes in fine black prisms dyes vegetable fibers from the vat in greyish black shades. The preparation of the dyestuff and the subsequent alkylation can be carried out also without separating the dyestuff before the alkylation.

A dyestuff which is very similar to the above obtained methylated dyestuff is obtained by reacting 45 parts by weight of 2-amino-1(N)-methyl-benzimidazol with 29 parts by weight of 1,4-diamino-2,3-dicyano-anthraquinone in the manner described above. Cotton is dyed with both dyestuffs from the vat in nearly equal shades, but the dyestuffs show minor differences in their properties if used in a printing process, for example they need a different time for their fixation.

Example 5

29 parts by weight of 1,4-diamino-2,3-dicyan-anthraquinone and 15 parts by weight of 2-amino-benzimidazole are caused to react with one another in 600 parts by weight of trichlorobenzene at 180–185° C., until the starting material disappears. After working up as usual, a crystalline black reaction product is obtained in good yield which dissolves in boiling quinoline with a green color. The color of the solution in 96 percent sulfuric acid is brown; by flocculating the sulfuric acid solution in an acid medium a grey paste is obtained which changes to bluish grey in an ammoniacal medium. On slight heating with an alkaline sodium hydrosulfite solution the compound yields a blue vat.

The product may be further reacted with another mol of amino-benzimidazole or another amino compound. The dyestuffs obtained can be alkylated as described in Example 4.

Example 6

20 parts by weight of the product obtainable according to Example 5, paragraph 1, 10 parts by weight of 2-amino-6-ethoxy-benzthiazole and 400 parts by weight of trichlorobenzene are heated together to the boil, until the splitting off of ammonia is completed. After being cooled off, the dyestuff is filtered off with suction, washed with trichlorobenzene and methanol and dried. In contrast to the starting material, the new compound vats readily and immediately with a bluish green color, dissolves with difficulty in boiling quinoline with an olive black color and is obtained therefrom in small black needles. The substance may subsequently be alkylated for example as described in Example 4.

Example 7

In a boiling nitrobenzene bath, 3 parts by weight of 1,4-diamino-2,3-dicyanoanthraquinone and 12 parts by weight of 3-amino-1,2,4-triazole are melted together. Since the reaction mixture thickens as the reaction proceeds, another 6 parts by weight of 3-amino-1,2,4-triazole are added. On further heating a stage is again reached after about 2 hours in which further stirring is almost impossible. The melt is then cooled to 150° C., diluted with 50 parts by weight of dimethylformamide, briefly heated again to 160° C. another 25 parts by weight of dimethylformamide are added, and, finally, the pigment dyestuff is filtered off with suction at 40° C. The filter residue is washed with dimethyl-formamide and methanol, until the discharge liquid is clear. By working up in this manner a pure product is immediately obtained which crystallizes in greyish black small needles. The vat color is blue, the solution in concentrated sulfuric acid olivish green, the acidic paste is also olive green and changes to greyish green on the addition of an excess of ammonia. The dyestuff can be alkylated as described in Example 4.

Example 8

2 parts by weight of 1,4-diamino-2,3-dicyanoanthraquinone, 4 parts by weight of 2-amino-4-methyl-pyrimidine and 40 parts by weight of trichlorobenzene are heated to the boil under reflux for 8 hours. The product is then filtered off with suction at 40° C. and the filter residue washed several times with methanol.

For purification the filter residue, still moist with methanol, is suspended with 120 parts by weight of a mixture of pyridine and methanol (1:1), treated with 1 part by weight of a 30 percent sodium hydroxide solution and briefly heated to 40° C. The product is then filtered off from the insoluble residue and the blue filtrate is diluted with about 800 parts by weight of water. Bluish green flakes thus precipitate which are collected on a filter, washed several times with water and, finally, dried.

The substance vats blue and, on shaking the vat with air, yields an olivish green paste. The color of the solution in concentrated sulfuric acid is dull olivish green.

By directly melting 1,4-diamino-2,3-dicyananthraquinone with an excess of 2-amino-4-methyl-pyrimidine at 210° C. for 3 hours, a barely vattable product is obtained which dissolves in sulfuric acid with a blackish brown color. When its solution in sulfuric acid is diluted with water, blackish brown flakes precipitate. On the addition of ammonia the color of the acidic paste changes only slightly. The dyestuffs can be alkylated as described in Example 4.

Example 9

10 parts by weight of 1,4-dihydroxy-2,3-dicyanoanthraquinone, 50 parts by weight of 2-aminobenzimidazole and 25 parts by weight of nitrobenzene are heated with stirring on a boiling o-dichlorobenzene bath. At 180° C. the mixture melts together and the temperature rises to about 195° C. with a vigorous splitting off of ammonia. As soon as the mass has thickened, a further 150 parts by weight of nitrobenzene are added and the reaction mixture is allowed to react for a further ½ hour. The cold blackish brown crystalline mass is diluted with acetone, filtered off and washed with acetone, until the discharge liquid is clear.

The reaction product thus obtained in good yield dissolves in strong sulfuric acid with a red color, in a mixture of pyridine, water and sodium hydroxide solution with a bluish violet color and vats olive green.

In a similar manner 1,4-dihydroxy-2,3-dicyananthraquinone may be reacted with 2-amino-benzthiazole. The dyestuffs can be alkylated as described in Example 4.

In a similar manner to 2-aminobenzthiazole, for example, 2-amino-4-phenylthiazole, 2-amino-4-methylthiazole, 2-amino-4,5-dimethylthiazole, with 1,4-diamino-2,3-dicyananthraquinone react and yield likewise grey dyestuffs. The formation of the dyestuff is expediently carried out in excess amine with the use of a little solvent as shown by the following composition:

25 parts by weight of 1,4-diamino-2,3-dicyananthraquinone
70 parts by weight of 2-amino-4,5-dimethylthiazole
30 parts by weight of trichlorobenzene This mixture is heated to 180° C. for 1½ hours and at the end briefly to 200° C. After dilution with pyridine a well crystalline barely soluble reaction product is obtained. For dyeing, the dyestuff should be redissolved from sulphuric acid or revatted in the presence of pyridine.

Example 10

For some colouring effects mixed dyestuffs have sometimes certain advantages. Compounds of this kind are obtained for example in the following manner:

120 parts by weight of nitrobenzene
7.2 parts by weight of 1,4-diamino-2,3-dicyananthraquinone
4.5 parts by weight of 2-amino-5-chlorobenzimidazole are heated together to 180–190° C. for about 2½ hours and then briefly to 200° C. 3.8 parts by weight of 2-aminobenzimidazole are then added and the whole is stirred at 208° C. for another 5 hours. After isolation, the mixed dyestuff is obtained in a yield of 13 parts by weight. The sequence can also be altered and 2-aminobenzimidazole can first be added and 2-amino-5-chlorobenzimidazole can then be acted upon the former. Neither yield nor quality of the dyestuff are influenced by it.

Example 11

58 parts by weight of 1,4-diamino-2,3-dicyananthraquinone
28 parts by weight of 2-aminobenzimidazole
900 parts by weight of trichlorobenzene are stirred together at 180° C. for 5 hours and at boiling temperature for ¼ hour and the precipitated one-sided conversion product is filtered off at 60° C., washed with methanol and trichlorobenzene and dried. Yield 80 parts by weight. The intermediate product thus obtained can be recrystallised from quinoline. It shows a brownish red vat colour. A mixture of—

42 parts by weight of the recrystallised intermediate
15 parts by weight of 2-amino-1(N)-methyl-benzimidazole
400 parts by weight of trichlorobenzene is heated to the boil for 7 hours and then worked up. Yield: 50 parts by weight of a mixed dyestuff vatting with a blue colour. The product dyes cotton a greyish black shade.

The synthesis of other combinations is also possible, such as the preparation of dyestuffs of the following general formula

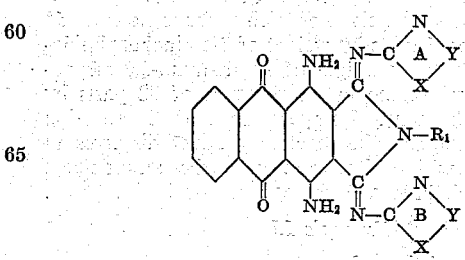

wherein the ring A and the ring B are different, $R_1$ is a hydrogen atom or an alkyl group and wherein the anthraquinone radical may further be substituted e.g. in the 5 and/or 6 position by halogen, alkyl or alkoxy-groups.

Example 12

7.2 parts by weight of 1,4-diamino-2,3-dicyanthraquinone
10 parts by weight of 2-amino-5(6)-chlorobenzimidazole
100 parts by weight of trichlorobenzene are kept boiling with stirring until the splitting off of ammonia is completed and the dyestuff thus formed is worked up as described in Example 1.

By dissolution of the crude product in 96 percent sulphuric acid and dilution of this solution with 50 percent sulphuric acid below 20° C. there is formed a well crystal-cooling to 100° C. the mixture is diluted with 100 parts by weight of pyridine and the barely soluble reaction product is filtered off by suction at 30° C. The residue is dried after washing with pyridine and methanol. The black crystalline powder is scarcely soluble in nitrobenzene and barely soluble in quinoline with a greyish black colour. The solution in sulphuric acid is bluish green. Cotton is dyed from a bluish green vat in grey shades which turn greenish grey upon boiling with soap.

1,4-diamino-5,8-dimethoxy - 2,3 - dicyananthraquinone used as starting material can be prepared for example as follows:

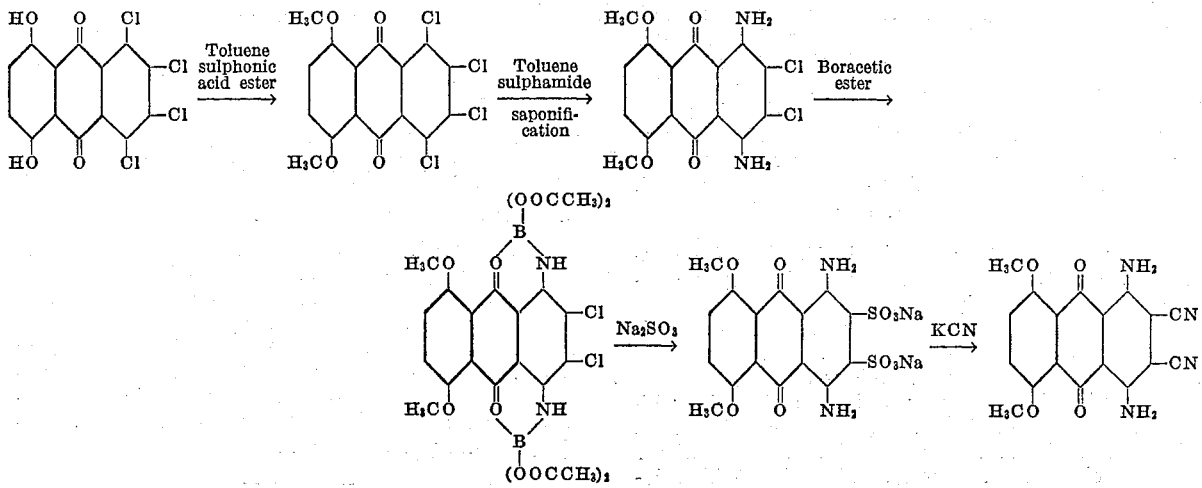

line sulphate. The vat dyeings produced with this dyestuff distinguish themselves only little in their shade from the dyeings obtained by the process of Example 4.

In a similiar manner, 2-amino-5,7-dichlorobenzimidazole can be used for the conversion. In this case there are obtained from 1 part by weight of 1,4-diamino-2,3-dicyananthraquinone, 2 parts by weight of a vat dyestuff crystallising in greyish black needles.

Example 13

By condensation of 4 parts by weight of 1,4-diamino-2,3-dicyananthraquinone with 6 parts by weight of 2 - amino - 5(6) - methoxybenzimidazole in 60 parts by weight of boiling trichlorobenzene there is also formed a bluish grey vat dyestuff with splitting off ammonia. The vat colour is greenish blue, the colour of the solution in concentrated sulphuric acid brown and in formic acid dull violet. The fastness to wet processing can be improved by subsequent alkylation.

Example 14

Intense grey vat dyestuffs are also obtainable by heating 1 part by weight of 1,4-diamino-2,3-dicyan-6-chloranthraquinone, 6 parts by weight of 2-aminobenzimidazole and 2.5 parts by weight of trichlorobenzene to 205° C. or by reacting 5 parts by weight of 2-aminobenzimidazole with 3.6 parts by weight of 1,4-diamino-2,3-dicyan-6,7-dichloranthraquinone in the presence of 72 parts by weight of nitrobenzene. Temperature 205° C., reaction time about 3 hours. The reaction product dissolves in sulphuric acid with a brown colour, the ammoniacal paste is greenish blue and the vat colour bluish green.

Example 15

A mixture consisting of—

30 parts by weight of 1,4-diamino-5,8-dimethoxy-2,3-dicyananthraquinone
27 parts by weight of 2-aminobenzimidazole and
400 parts by weight of nitrobenzene is heated to 200–208° C. for about 7 hours. After 1,4-diamino-5,8-dimethoxy - 2,3 - dicyananthraquinone dissolves in 96 percent sulphuric acid with a green shade, and in concentrated hydrochloric acid with a reddish violet shade; the vat colour is also reddish violet.

Example 16

When 3 parts by weight of 2,3-dicyananthraquinone are melted together with 18 parts by weight of 2-aminobenzthiazole at 170–175° C. reaction takes place very rapidly and the composition becomes thick very soon. The temperature is kept for some time. The reaction product crystallising in brownish red needles can be worked up upon dilution with a suitable organic solvent. The dyestuff obtained in this way dissolves in concentrated sulphuric acid with a yellowish brown colour, vats with a green colour and dyes vegetable fibres in orange brown shades. When the dyestuff is alkylated with toluene sulphonic acid esters in the presence of potassium carbonate at 120° C., the brown prisms of the starting material change into small orange yellow needles which are barely vattable.

Example 17

After heating 30 parts by weight of 2,3-dicyananthraquinone with 60 parts by weight of 2-aminobenzimidazole in 600 parts by weight of trichlorobenzene to 205–210° C. for 3 hours a reaction product is obtained in very good yield after conventional working up the bulk of which consists apart from a few yellow leaflets of slightly yellow coloured needles. Upon heating in quinoline for a short time the mixture changes quantitatively into uniform orange crystals. The orange compound which is stable in concentrated sulphuric acid to some extent is slightly split in 78 percent sulphuric acid. It yields a green vat and dyes cellulose fibre a brown shade.

By alkylation with toluene sulphonic acid methyl ester the orange dyestuff changes into reddish brown prisms which, in contrast to the starting material, are no longer soluble in cold pyridine. The alkylation product dyes cotton from a vat in orange shades.

Example 18

16 parts by weight of the methoxyimino-imide of 1,4-diaminoanthraquinone-2,3-dicarboxylic acid of the following constitution

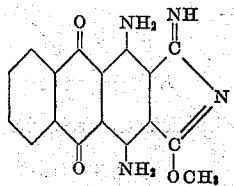

10 parts by weight of 2-aminobenzimidazole and 120 parts by weight of nitrobenzene are heated to 180° C. for about 8 hours. The mixture is then filtered off at this temperature, washed with hot pyridine and finally with alcohol and dried. Yield: 16.8 parts by weight of dyestuff. The dyestuff dissolving in formic acid with a green colour and in 78 percent sulphuric acid with a bluish red colour dyes cotton from a blue vat in greenish grey shades.

The above mentioned methoxyimino imide can be produced by the action of sodium methylate upon 1,4-diamino-2,3-dicyananthraquinone.

Into a solution of 30 grams of sodium in 2880 parts by weight of methanol there are added 288 parts by weight of 1,4-diamino-2,3-dicyananthraquinone and the reaction product is heated to the boil for 5 hours. The mixture is cooled, fitered off by suction and the residue is washed with methanol until the discharge is slightly blue.

The blackish blue prisms dissolve in hydrochloric acid with a red colour, in formic acid with a dull greenish blue colour; the olive green solution in sulphuric acid rapidly changes to brown. Vat colour: violet.

Analysis.—$C_{17}H_{12}O_3N_4$:

|  | C, percent | H, percent | O, percent | N, percent |
| --- | --- | --- | --- | --- |
| Calculated | 63.8 | 3.75 | 15.0 | 17.5 |
| Found | 63.5 | 3.78 | 15.0 | 16.8 |

Example 19

Into 420 millilitres of methanol, ammonia is introduced with cooling (using a mixture of ice and common-salt), until the solution reaches a volume of 600 millilitres at 0° C. Upon the addition of 28.8 grams of 1,4-diaminoanthraquinone-2,3-dinitrile, the melt is heated to 120° C. for 8 hours in an autoclave at a pressure of 26 atmospheres. The mixture is cooled, filtered off with suction and washed with methanol until free from ammonia. The bluish black microscopic prisms are air-dried. Vat: bluish violet, solution in concentrated sulphuric acid: red, in formic acid: dull greenish blue.

20 parts by weight of the reaction product thus obtained, 120 parts by weight of 2-amino-6-ethoxybenz-thiazole and 25 parts by weight of trichlorobenzene are carefully heated to 200° C. The conversion takes place with vigorous reaction, blackish grey crystals separating out from the melt. As soon as the ammonia fission is completed, the mixture is cooled to 120° C., diluted with pyridine, and the barely soluble reaction product filtered off with suction, washed and dried. The solution in concentrated sulphuric acid is brown; the acidic paste is grey and when rendered ammoniacal olivish green. The vat colour is green.

Example 20

2.9 g. of 1,4-diamino-anthraquinone-2,3-dinitrile are heated in 25 g. of 2-aminobenz-oxazole at 210° C. for 6 hours. The melt thus obtained is diluted with 75 ml. of pyridine, filtered off with suction at 80° C. and washed at 80–100° C. with hot pyridine until the filtrate shows a reddish coloration. After washing with methanol the product is dried at 100° C. The greyish-olive needles dissolve in sulfuric acid with reddish-brown, and in pyridine/methanol/soda lye with weak, dull violet coloration. The product is insoluble in hydrochloric acid and formic acid. It dryes cotton from a blue-green vat in every strong olive shades.

I claim:

1. An anthraquinone dyestuff corresponding to the formula

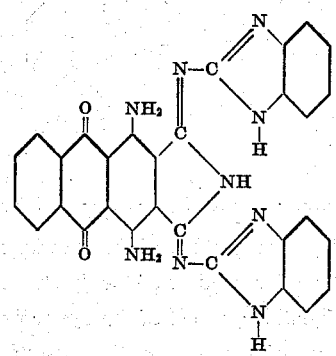

2. An anthraquinone dyestuff corresponding to the formula

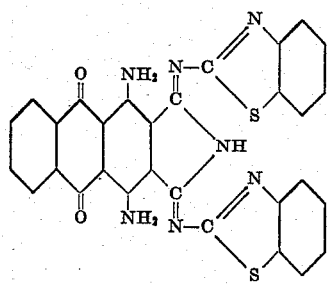

3. An anthraquinone dyestuff corresponding to the formula

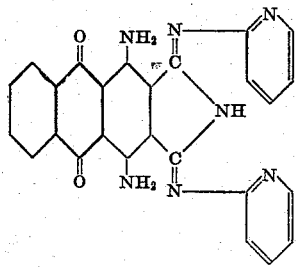

4. An anthraquinone dyestuff corresponding to the formula

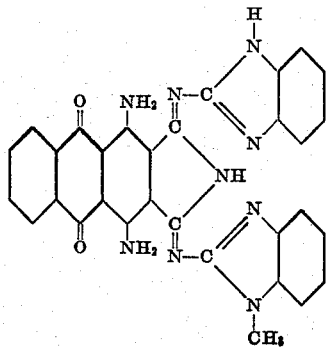

5. An anthraquinone dyestuff corresponding to the formula

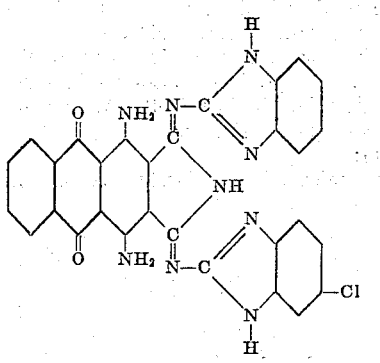

6. The methylation product of the dyestuff of claim 1.
7. The methylation product of the dyestuff of claim 2.
8. The methylation product of the dyestuff of claim 3.
9. The methylation product of the dyestuff of claim 4.
10. The methylation product of the dyestuff of claim 5.

11. An anthraquinone dyestuff of the formula

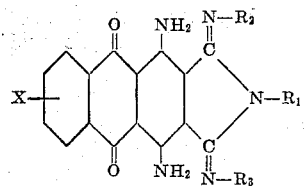

wherein X is a radical selected from the group consisting of H, Cl, $NO_2$ $(CH_3)_2\overset{\overset{O}{\|}}{C}-NH$ and $CH_3O$; $R_1$ is a radical selected from the group consisting of H and lower alkyl; and $R_2$ and $R_3$ are each a radical selected from the group consisting of bz-ethoxybenzthiazolyl-2; pyridinyl-2; benzimidazolyl-2; 1(N)-methyl-benzimidazolyl-2; 1,2,4-triazolyl-2; methylpyrimidinyl-2; benzthiazolyl-2; 4-phenylthiazolyl-2; 4-methylthiazolyl-2; 4,5-dimethylthiazolyl-2; bz-chlorobenzimidazolyl-2; bz-methoxy-benzimidazole, and benzoxazolyl-2; and the methylation and ethylation products thereof.

References Cited in the file of this patent
UNITED STATES PATENTS
2,753,356    Laucius _____ July 3, 1956